United States Patent [19]

Fujiwara

[11] Patent Number: 4,549,619
[45] Date of Patent: Oct. 29, 1985

[54] COMBINATORIAL WEIGHING APPARATUS

[75] Inventor: Atsushi Fujiwara, Kyoto, Japan

[73] Assignee: Kabushiki Kaisha Ishida Koki Seisakusho, Kyoto, Japan

[21] Appl. No.: 629,567

[22] Filed: Jul. 10, 1984

[30] Foreign Application Priority Data

| Jul. 11, 1983 | [JP] | Japan | 58-107979[U] |
| Jul. 12, 1983 | [JP] | Japan | 58-108565[U] |
| Jul. 13, 1983 | [JP] | Japan | 58-109460[U] |
| Jul. 13, 1983 | [JP] | Japan | 58-109461[U] |
| May 16, 1984 | [JP] | Japan | 59-72099[U] |
| May 18, 1984 | [JP] | Japan | 59-73638[U] |

[51] Int. Cl.$^4$ .............. G01G 19/22; G01G 13/22; G01G 13/34; B67D 5/64
[52] U.S. Cl. ............................. 177/25; 177/99; 177/112; 222/160
[58] Field of Search ............ 177/25, 99, 108, 112, 177/113; 222/160, 162

[56] References Cited

U.S. PATENT DOCUMENTS

| 1,606,625 | 11/1926 | Grandjean | 177/99 X |
| 3,734,215 | 5/1973 | Smith | 177/99 X |
| 3,817,340 | 6/1974 | Peasnall | 177/99 X |
| 4,399,880 | 8/1983 | Konishi | 177/25 X |
| 4,418,771 | 12/1983 | Henry et al. | 177/25 X |
| 4,437,527 | 3/1984 | Omae et al. | 177/25 |
| 4,446,938 | 5/1984 | Kawanishi | 177/25 |

Primary Examiner—George H. Miller, Jr.
Attorney, Agent, or Firm—Staas and Halsey

[57] ABSTRACT

A combinatorial weighing apparatus in which an operator manually supplies a combinatorial weighing apparatus with articles to be weighed is provided with hopper sets each of which has two weighing hoppers and a single movable pool hopper for supplying the articles to the two weighing hopper in the hopper set. An article supply table is capable of being swung open by virtue of a hinge mechanism, and a plate constituting the top of the supply table is capable of being removed. This arrangement allows detachable pool hoppers and weighing hoppers to be easily removed from the combinatorial weighing apparatus.

20 Claims, 16 Drawing Figures

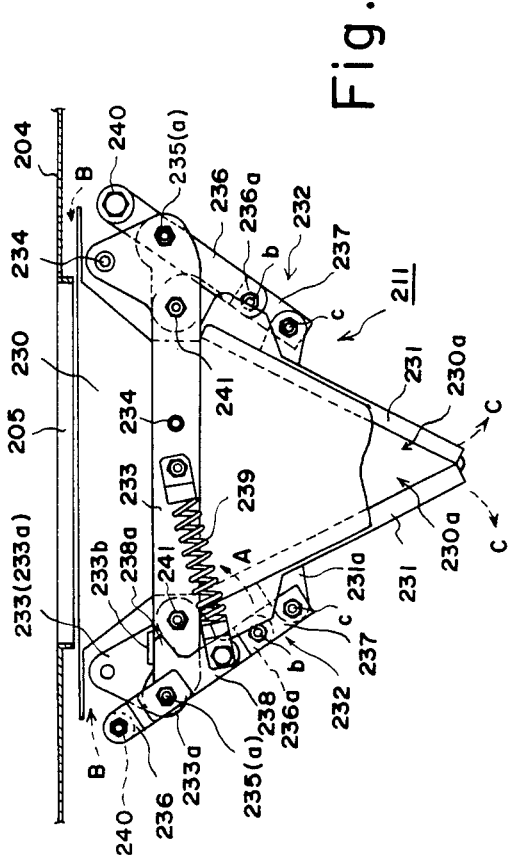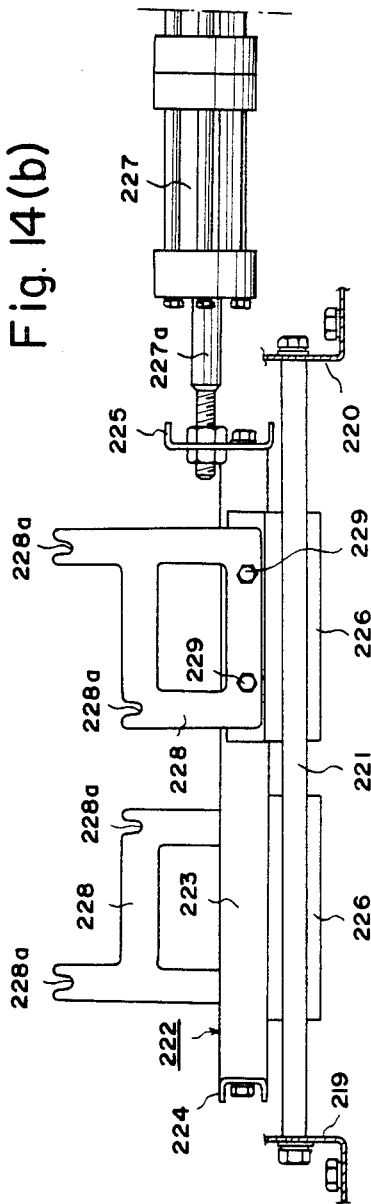

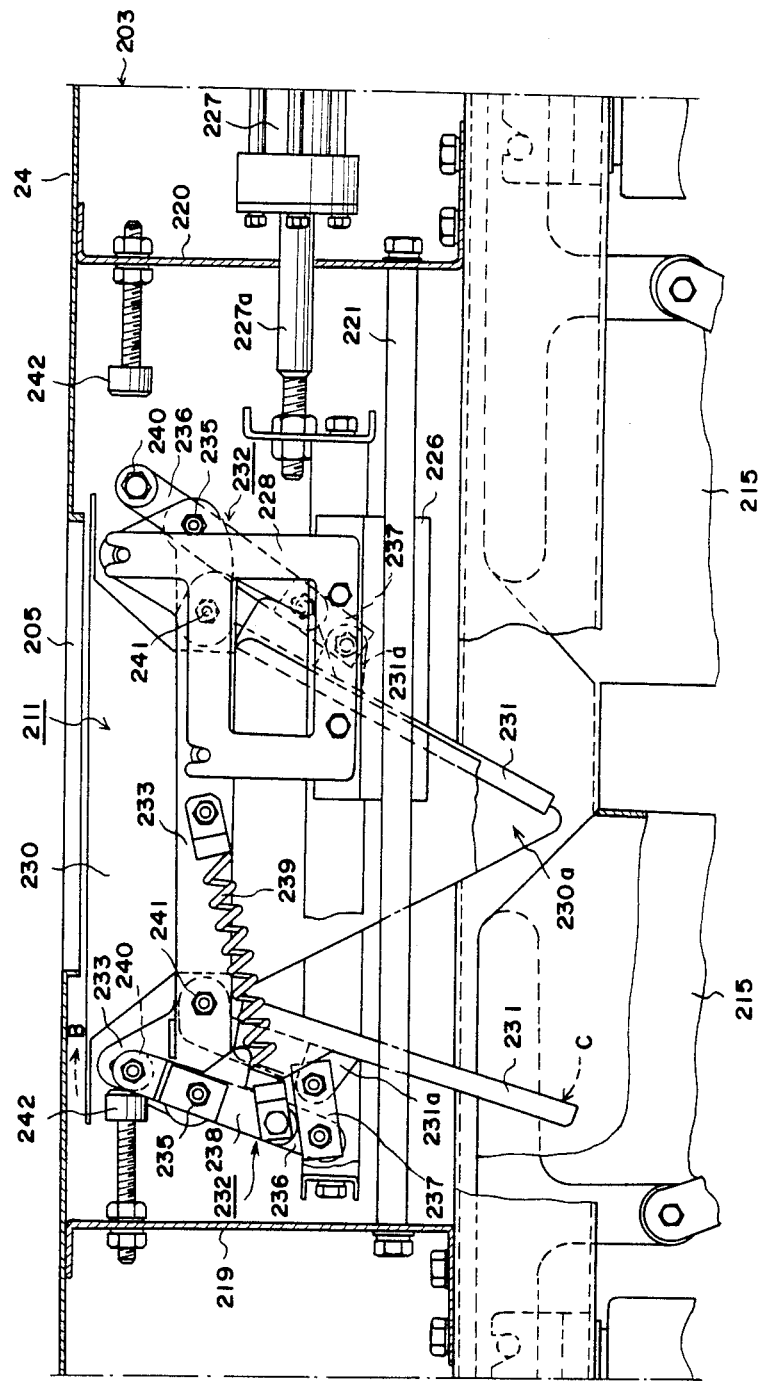

COMBINATORIAL WEIGHING APPARATUS

BACKGROUND OF THE INVENTION

This invention relates to a combinatorial weighing apparatus and, more particularly, to a semiautomatic combinatorial weighing apparatus wherein an operator manually supplies the combinatorial weighing apparatus with articles to be weighed.

An example of a conventional combinatorial weighing apparatus includes a plurality of weighing hoppers and a weighing machine provided for each weighing hopper, each weighing hopper and weighing machine forming a pair. Batches of articles introduced into each weighing hopper are weighed, a combinatorial computation is performed using a plurality of weight values obtained from the weighing machines, there is selected an optimum combination having a combined weight value which agrees with or is closest to a target weight, and solely those articles contained in the weighing hoppers having a total weight equal or closest to the optimum combination are discharged, whereby there is obtained a batch of articles having a weight which is equal or close to the target weight value.

To raise the speed of the weighing operation in a combinatorial weighing apparatus of this type, a pool hopper is provided above each weighing hopper and it is arranged so that a weighing hopper which has discharged its articles, owing to participation in the optimum combination, is immediately supplied with articles for the next weighing cycle by the overlying pool hopper. An emptied pool hopper is supplied with articles automatically or by a manual operation performed by an operator.

With the above-described arrangement, the number of pool hoppers provided is the same as that of the weighing machines and, hence, of the weighing hoppers. This increases the number of component parts or results in a more complicated arrangement and raises cost. In particular, in the case of a so-called semiautomatic combinatorial weighing apparatus adapted so that articles are introduced into the pool hoppers by a manual operation, it is difficult to introduce the articles, in a short period of time, into pool hoppers of a number equal to the number of plural weighing hoppers participating in an optimum combination. Moreover, since the number of pool hoppers is large, they are disposed over a wide area. Therefore, an operator cannot perform his task efficiently, or there is a need to increase the number of operators. Though a countermeasure might be to reduce the number of weighing machines themselves, this would inevitably diminish weighing precision.

Further, a semiautomatic combinatorial weighing apparatus is provided with an article supply table on which articles to be introduced into the pool hoppers are placed in advance. It is desirable that the supply table be disposed as close to the tops of the pool hoppers as possible and within easy reach of the operator. With such an arrangement, however, the construction is such that the pool hoppers and their underlying weighing hoppers are covered by the supply table. As a result, cleaning these hoppers, which is necessary from the viewpoint of sanitation, becomes a difficult affair. This is particularly true with regard to the cleaning of weighing hoppers situated below the pool hoppers. Furthermore, provided below the weighing hoppers is a collecting conveyor for collecting weighed articles discharged from plural weighing hoppers participating in the optimum combination. Cleaning the conveyor is also difficult because it underlies the weighing hoppers.

As mentioned above, the pool hoppers are disposed above the weighing hoppers to hasten the supply of articles, used in the next weighing cycle, to weighing hoppers which have discharged their articles. However, owing to this arrangement in which the pool hoppers are disposed so as to overlie the weighing hoppers, a problem arises in connection with a gate provided on each weighing hopper. Specifically, the hopper customarily has a discharge outlet provided on a lower side face thereof, with a gate being pivotally attached at its upper edge portion to the upper part of the discharge outlet. The discharge outlet is opened and closed as the lower part of the gate swings back and forth. With a construction of this type, the weight of the articles within the hopper acts upon the gate in such a manner that the gate is forced open. For this reason, a spring and a toggle-type link mechanism or the like are necessary in order to hold the gate closed. The result is a gate actuating mechanism of great complexity.

A solution to this problem would be to provide the hopper with a gate which opens and closes the discharge outlet by moving up and down along the opening of the discharge outlet, which is provided on the lower side face of the hopper body. The gate normally would be held in a closed position under its own weight but would be designed to be opened in an upward direction upon receiving an externally applied force. With such an arrangement, the weight of the articles within the hopper would act upon the gate in a direction at right angles to the opening direction, so that the gate would be held closed in reliable fashion without using a spring and link or toggle mechanism. In order to provide a wide discharge outlet the gate must be raised upwardly to a position where it would project from the upper side of the hopper body. If the hopper is a weighing hopper and a pool hopper is disposed above the weighing hopper as in the above-described arrangement, either the gate cannot be raised high enough or a great amount of space must be provided between the weighing hopper and the overlying pool hopper. The result is an inconvenience in either case.

SUMMARY OF THE INVENTION

An object of the present invention is to provide a combinatorial weighing apparatus in which the number of pool hoppers can be reduced without diminishing the number of weighing machines.

Another object of the present invention is to facilitate the cleaning of pool hoppers and of underlying weighing hoppers in a combinatorial weighing apparatus of the type in which the pool hoppers and weighing hoppers are covered by an article supply table, and to facilitate the cleaning of a collecting conveyor situated below the weighing hoppers in such a weighing apparatus.

Still another object of the present invention is to provide a simplified structure for the gate of a hopper such as the weighing hopper of a combinatorial weighing apparatus, which structure enables the gate to be opened and closed reliably without requiring a large amount of space.

A further object of the present invention is to provide a structure whereby a pool hopper gate can be actuated automatically.

According to the present invention, the foregoing objects are attained by providing a combinatorial weighing apparatus which includes a base and an article supply table disposed on the base. Disposed on the base in two rows are a plurality of weighing machines each of which has a weighing hopper. The weighing machines are arranged in such a manner that their weighing hoppers oppose each other. Disposed on the underside of the article supply table in a single row are pool hoppers, one for every two of the opposing weighing hoppers. The central portion of the top side of the article supply table includes a row of article charging inlets, of a number equivalent to the number of pool hoppers, for introducing articles into the pool hoppers. Each pool hopper is moved laterally from an intermediate position underlying the corresponding article charging inlet to a point directly above either of the two weighing hoppers on both sides, whereby a weighing hopper which has discharged its articles owing to participation in an optimum combination is resupplied with articles for the next weighing cycle. Accordingly, in the combinatorial weighing apparatus of the type described, it is possible for the number of pool hoppers to be reduced to half the number of weighing machines.

Further, in the above-described arrangement, one side portion of the article supply table is connected to the base by means of hinges, so that the other side of the table can be swung open in the upward direction together with the pool hoppers. As a result, the weighing hoppers situated below the pool hoppers can be cleaned with ease. According to the present invention, a collecting conveyor provided for the weighing hoppers is capable of being withdrawn from one side so that cleaning of the conveyor also is facilitated.

In another aspect of the invention, it is possible to detach a plate constituting part of the article supply table. The plate covers the pool hoppers from above and is provided with article charging inlets at points corresponding to the intermediate positions of the pool hoppers. The pool hoppers are detachably supported on a slide member connected to a drive unit. The pool hoppers can therefore be easily detached.

In another embodiment of the present invention, each weighing hopper has an article charging inlet and an article discharge outlet, and is equipped with a gate for opening and closing the discharge outlet. The gate comprises an upper gate and a lower gate for closing the upper and lower half portions of the discharge outlet, the upper and lower gates being openable in an upward direction along the opening of the discharge outlet. The lower gate is opened by being moved upwardly in response to an externally applied operating force and is adapted to overlap the upper gate in the course of being moved. The upper gate is engaged by the lower gate as it is overlapped by the latter and is adapted to open by moving upwardly together with the lower gate. According to this arrangement, the gate, once closed, will not be opened by the weight of the articles within the hopper. Moreover, since the upper and lower gates overlap when the discharge outlet is opened, the gate will not project above the upper end face of the hopper, as sometimes occurs when a gate having a unitary construction is opened by being moved in the upward direction.

According to the present invention, in a combinatorial weighing apparatus having a number of weighing machines, the number of pool hoppers can be reduced to half that of the weighing machines, unlike the conventional combinatorial weighing apparatus where the pool hoppers and weighing machines are required to be equal in number. In addition, the gates provided on the pool hoppers can be opened automatically without requiring separate drive means. In a combinatorial weighing apparatus of this kind, therefore, the overall structure is greatly simplified and costs are reduced.

The present invention also makes it possible to clean the pool hoppers, weighing hoppers and a collecting conveyor in a very simple manner.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 14(a) and (b) are views illustrating a pool hopper and a hopper support member; and FIG. 15 is a side view for describing the operation of the pool hopper.

DESCRIPTION OF THE PREFERRED EMBODIMENTS

Reference will be had to FIGS. 1 through 9 to describe a first embodiment of the present invention.

Figure 1:
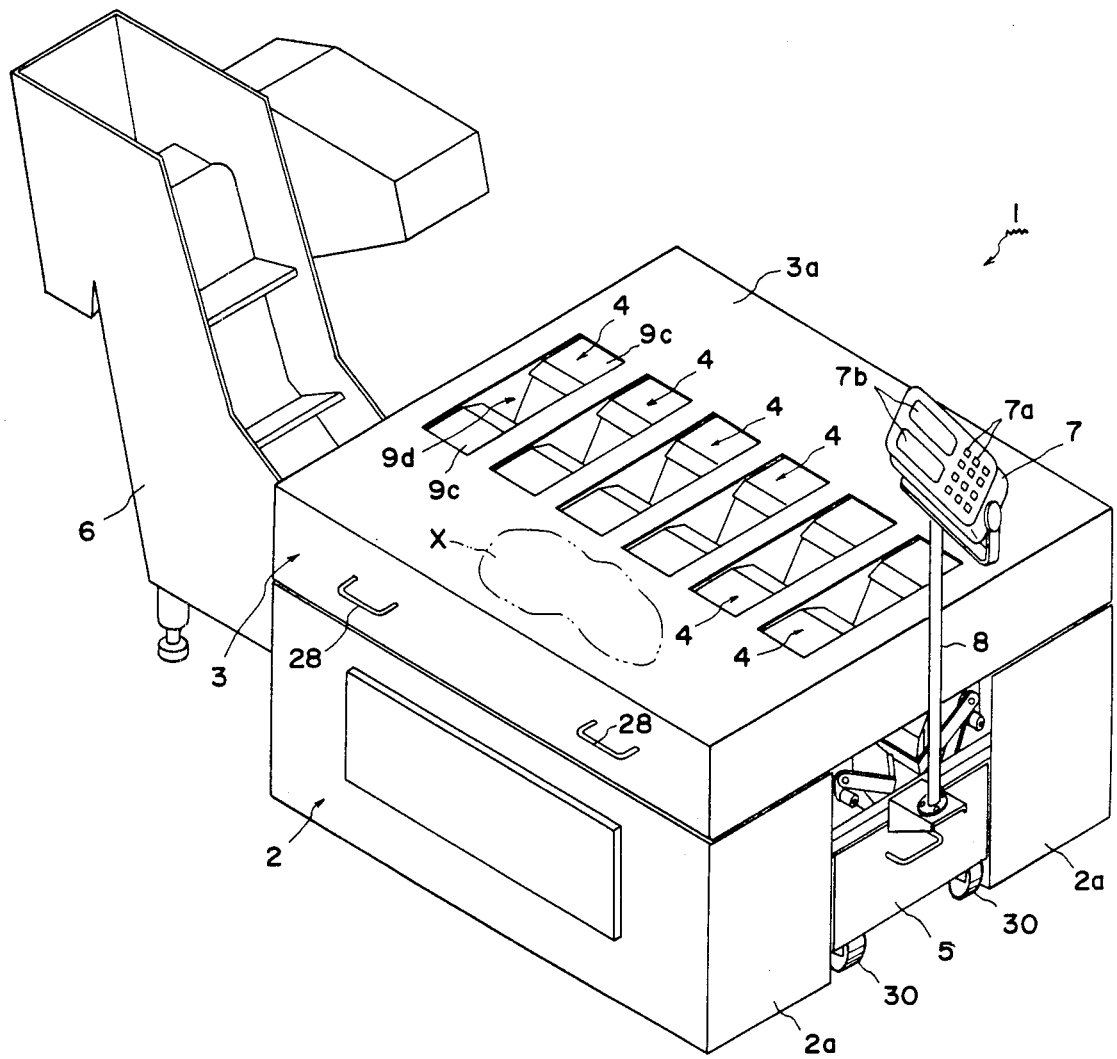
FIG. 1 is a perspective view illustrating a combinatorial weighing apparatus according to a first embodiment of the present invention.

As shown in FIG. 1, a combinatorial weighing apparatus 1 includes a base 2 and an article supply table 3 disposed on the base 2 and having a flat upper side 3a. Formed in a central portion of the upper side 3a of the article supply table are a row of six article charging inlets 4 . . . 4. The base 2 is separated into left and right side or first and second portions 2a, 2a between which a collecting conveyor 5 is so accommodated as to be withdrawable from a front end of the base. The terminus of the collecting conveyor 5 located at a back end of the base is contiguous to a discharge conveyor 6. A control box 7 is mounted on an upstanding support post 8 attached to one side of the base 2, and is provided with an array of keys 7a . . . 7a such as numeric keys for entering a target weight or the like, and with display devices 7b, 7b for displaying, e.g., a measured weight.

Figure 2:
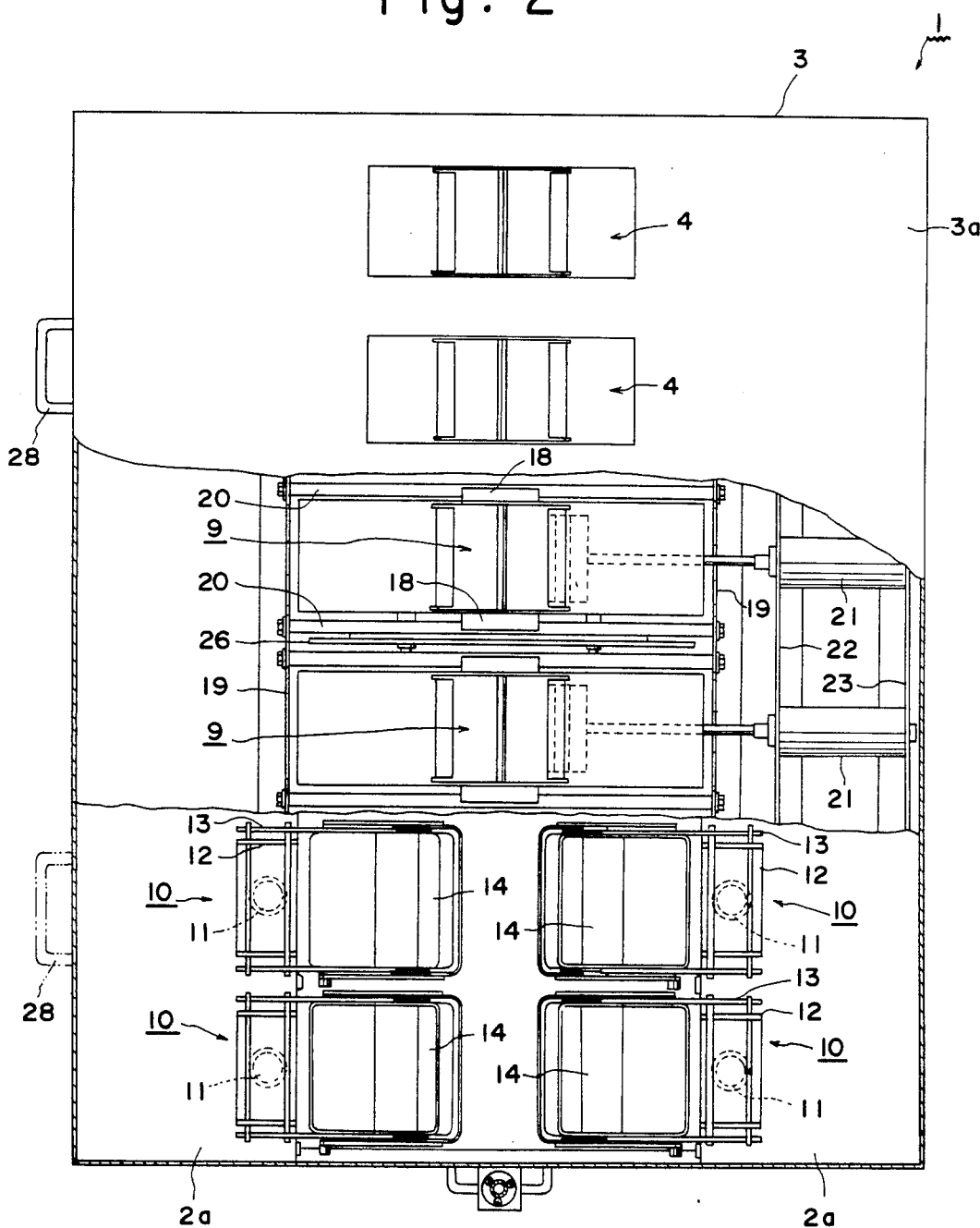
FIG. 2 is a top view, partially broken away, illustrating a portion of the combinatorial weighing apparatus.
Figure 3:
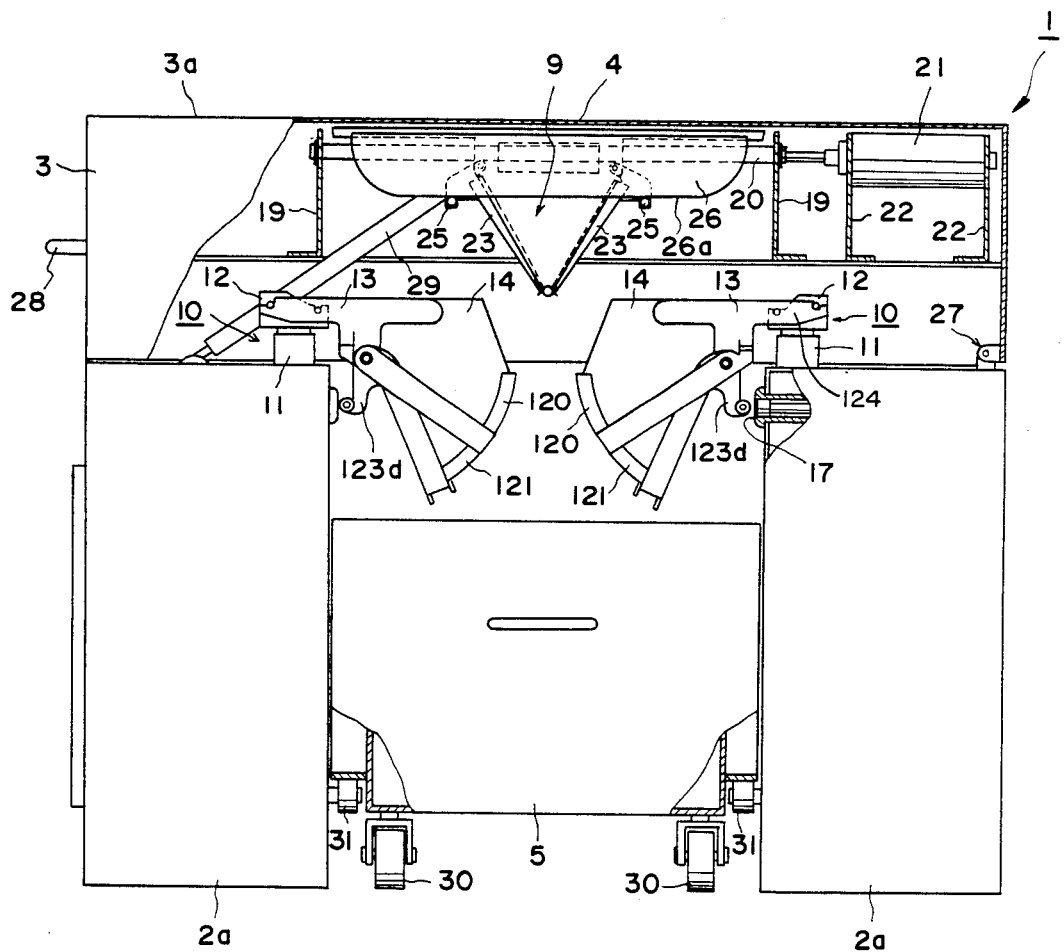
FIG. 3 is an end view of the combinatorial weighing apparatus.

The internal structure of the combinatorial weighing apparatus will now be described. As shown in FIGS. 2 and 3, six pool hoppers 9 . . . 9 are disposed below respective ones of the charging inlets 4 . . . 4 of the article supply table 3. A row of six weighing machines 10 . . . 10 is disposed on each of the left and right side portions 2a, 2a of the base 2, for a total of 12 weighing machines. Each of the weighing machines 10 . . . 10 comprises a weight sensor (load cell) 11 secured on the upper side of the respective base side portion 2a, and a weighing hopper 14 attached to the weight sensor 11 via engaging members 12, 13. The load acting upon the weight sensor 11 is the combined weight of the weighing hopper 14 and of the articles supplied to the weighing hopper.

Figure 4:
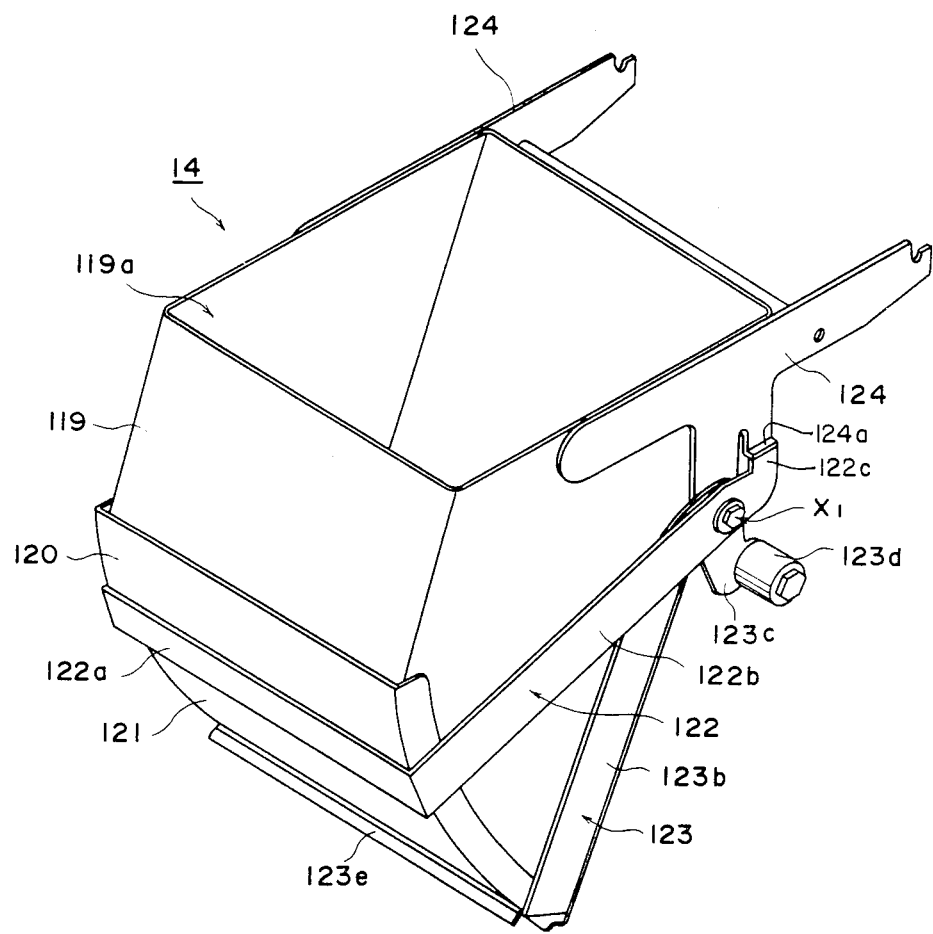
FIG. 4 is a perspective view of a weighing hopper.
Figure 5:
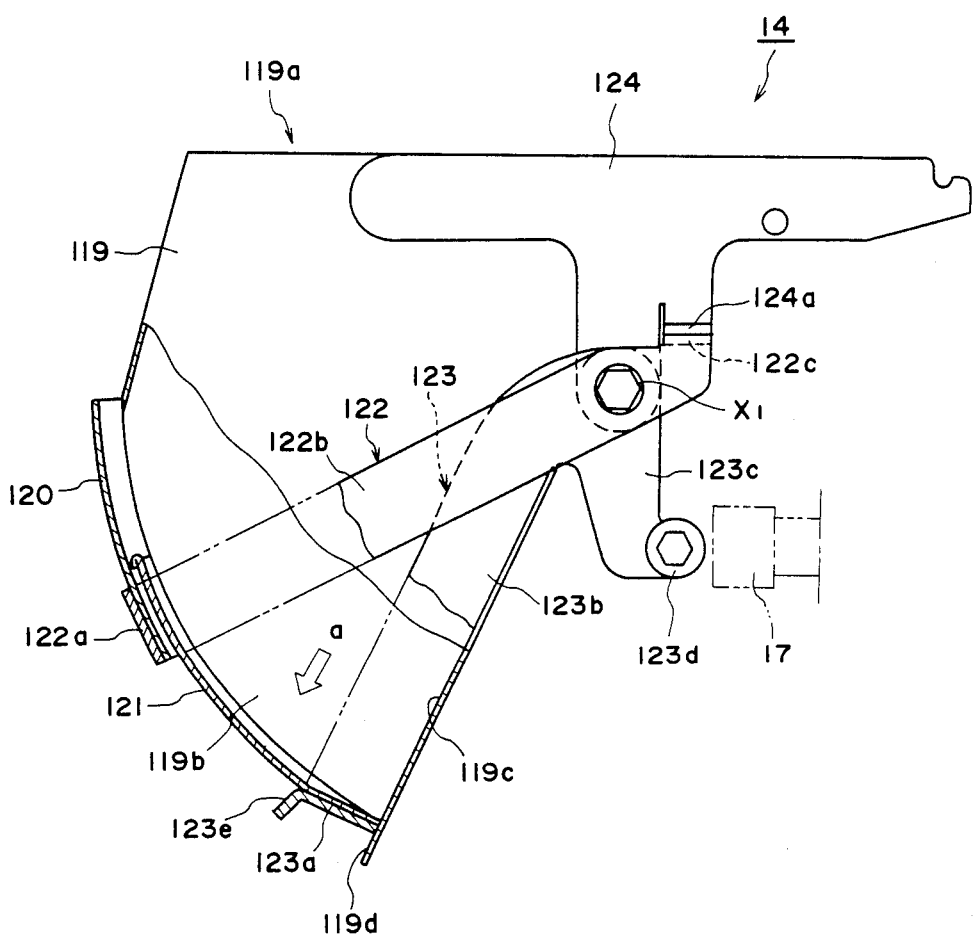
FIG. 5 is a side view of a weighing hopper.

The weighing hopper 14 has the construction shown in FIGS. 4 and 5. Specifically, the weighing hopper 14 includes a main body 119 whose upper side has an article charging inlet 119a and whose lower side has an article discharge outlet 119b, an upper gate 120 for closing the upper half portion of the discharge outlet 119b, and a lower gate 121 for closing the lower half portion of the discharge outlet 119b. U-shaped arm members 122, 123 have their intermediate sides 122a, 123a fixedly secured to the gates 120, 121 at their lower edge portions, respectively. The distal ends of parallel sides 122b, 122b and 123b, 123b of the respective arm members 122, 123 are pivotally attached to corresponding side surfaces of the hopper main body 119 via brackets 124, 124.

The gates 120, 121 swing back and forth about pivot points X1, X1 where the arm members 122, 123 are attached to the hopper main body 119, thereby opening and closing the discharge outlet 119b by moving along the opening of the outlet. In the illustrated embodiment, the distance from the lower gate 121 to the pivot points X1, X1 is shorter than the distance from the upper gate 120 to the pivot points X1, X1, so that the lower gate 121 will overlap the upper gate 120 when the lower gate is swung in the upward direction. Further, a bottom side 119c of the main hopper body 119 has an extension 119d which receives the lower gate 121. As a result, the lower gate 121 is held at a position where it closes the lower half portion of the discharge outlet 119b. A bent portion 122c provided on the distal end of one of the side portions 122b of arm member 122 comes into abutting contact with a stopper portion 124a provided on the bracket 124 to hold the upper gate 120 in a position where it closes the upper half of the discharge outlet 119b.

A lever portion 123c is provided on one of the side portions 123b of the arm member 123 for the lower gate 121. A roller 123d axially supported on the lever portion 123c is pushed by a push rod 17 projecting from the side surface of the base side portion 2a shown in FIG. 3, whereby the lower gate 121 is raised in the opening direction.

A forwardly projecting engaging piece 123e is provided on the intermediate side portion 123a of the arm member 123 fixedly secured to the lower gate 121. When the lower gate 121 is raised and overlaps the upper gate 120, the engaging piece 123e abuts against and engages a lower edge portion of the upper gate 120, whereby the upper gate 120 is raised in the opening direction together with the lower gate 121.

As shown in FIG. 3, the brackets 124, 124 engage an engaging member 12 fixedly secured to the top side of the weight sensor 11, whereby the weighing hopper 14 is attached to the weight sensor 11.

Figure 6:
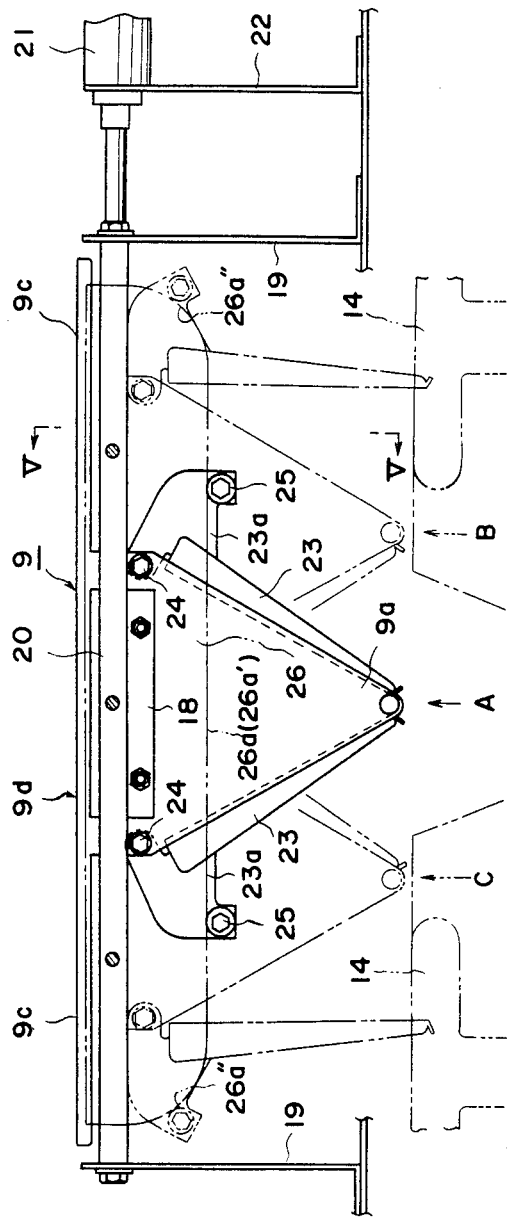
FIG. 6 is a side view of a pool hopper.
Figure 7:
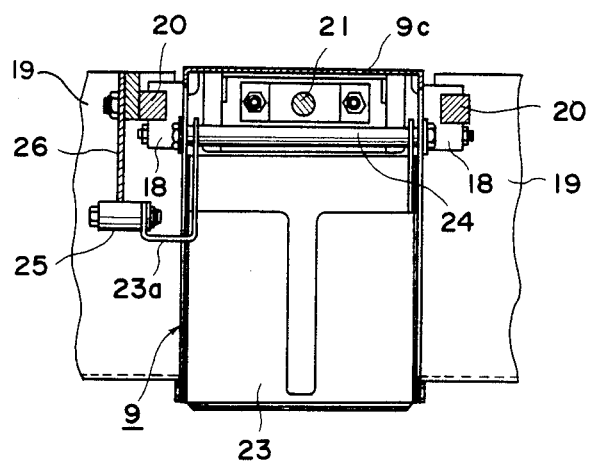
FIG. 7 is a front view of a pool hopper.

As shown in FIGS. 3, 6 and 7, C-shaped engaging members 18, 18, which are secured to both side surfaces of the main body 9a of each pool hopper 9, slidably engage parallel rails 20, 20 supported on the under side of the article supply table via support plates 19, 19. Thus, each pool hopper 9 is supported so as to be capable of moving about an intermediate position A, where the pool hopper is indicated by the solid line in FIG. 6, over a range bounded by positions B and C located directly above the left and right weighing hoppers 14, 14, at which positions the pool hopper is indicated by the phantom lines. A cylinder 21 serving as drive means for moving the pool hopper 9 to each of the positions C, A, and B is fixedly provided on the reverse side of the article supply table 3 via support members 22, 22.

The lower portion of the main body 9a of the pool hopper 9 defines a discharge outlet. Gates 23, 23 for opening and closing the right and left half portions of the discharge outlet are pivotally supported on the main body 9a via support shafts 24, 24. The gates 23, 23 are equipped with rollers 25, 25 attached to arm portions 23a, 23a. Attached to one of the rails 20, 20 is a guide plate 26 the lower edge 26a whereof receives the rollers 25, 25 from below. The lower edge 26a of the guide plate comprises a horizontal portion 26a' at the central portion thereof and upwardly curved portions 26a", 26a" at both ends thereof. When the pool hopper 9 is at the intermediate position A and the rollers 25, 25 are in contact with the horizontal portion 26a' of the lower edge 26a of the guide plate, the gates 23, 23 are held in an inclined attitude against their own weight to close the right and left half portions of the discharge outlet. When the pool hopper 9 is situated at one of the side positions B or C, however, the roller 25 on the corresponding side rolls upwardly along the curved portion 26a" of the guide plate, whereby the gate 23 on the corresponding side swings open in a downward direction under its own weight and under the weight of the articles within the hopper.

Shutter plates 9c, 9c extending to the left and right side of each pool hopper 9 are integrally provided on the main body 9a at the upper side of the pool hopper. When upper opening 9d of the pool hopper 9 is situated at the center of the article charging inlet 4, as shown in FIG. 1, both sides of the charging inlet 4 are closed from below by the shutter plates 9c, 9c. However, the length of the shutter plates 9c, 9c is such that when the pool hopper 9 is moved to one side, the side of the charging inlet 4 opposite from the side to which the pool hopper has been moved is closed off. It will be noted from FIG. 1 that the charging inlet 4 has a length which is greater than the width of the upper side opening 9d of the pool hopper 9. The reason for this is to assure that the opening 9d will not be completely closed off even when the pool hopper 9 is moved, i.e., so that a portion of the opening will be exposed from above. This is to prevent an operator's hand from becoming trapped when the hopper moves.

The operation of the foregoing embodiment will now be described. First, at the start of the weighing activity, articles X piled up on the flat upper side 3a of the article supply table 3, as shown in FIG. 1, are introduced in suitable quantities from the charging inlets 4 . . . 4 into the pool hoppers 9 . . . 9 situated below respective ones of the charging inlets. In this case, each pool hopper 9 is situated at the intermediate position A shown in FIG. 6, namely in such a manner that the upper side opening 9d is situated at the center of the charging inlet 4. The rollers 25, 25 provided on the gates 23, 23 of the hopper 9 are in contact with the horizontal portion 26a' of the lower edge portion 26a on guide plate 26. As a result, both gates 23, 23 are in an attitude which closes the right and left half portions of the discharge outlet of the hopper main body 9a. Each of the pool hoppers 9 . . . 9 is moved by the corresponding cylinders 21 . . . 21 from the above-described attitude to, e.g., the position B above the weighing hoppers 14 . . . 14 situated on the right side. At such time, the right-hand roller 25 rolls upwardly along the right-hand curved portion 26a" of the guide plate so that the right-hand gate 23 opens, thereby supplying the articles, which have been introduced into each of the pool hoppers 9 . . . 9, to respective ones of the right-hand weighing hoppers 14 . . . 14 en masse. Thereafter, each of the pool hoppers 9 . . . 9 is returned to the intermediate position A by operation of the cylinders 21 . . . 21 and the right-hand roller 25, which previously rolled upwardly along the right-hand curved portion 26, returns to the lower edge 26a of the guide plate 26 to close the open gate 23. At the instant the pool hoppers 9 . . . 9 return to the intermediate position A, the operator again manually charges the pool hoppers with suitable quantities of the articles X, which are located on the article supply table 3. The cylinders 21 . . . 21 are then actuated to move the pool hoppers 9 . . . 9 to the position C overlying the weighing hoppers 14 . . . 14 situated on the left side, whereupon articles X are supplied to the left-hand weighing hoppers 14 . . . 14 in the above-described manner.

Articles are thus supplied to all 12 of the weighing hoppers 14 . . . 14, which are arranged in two rows, and the pool hoppers 9 . . . 9, which have been restored to the intermediate position A, are provided with a further supply of articles. Under these conditions, the articles within each of the weighing hoppers 14 . . . 14 are weighed by respective ones of the weight sensors 11 . . . 11, and a combinatorial computation based on the weight values obtained is performed by a computerized control unit, not shown, having a calculating function. The same unit selects an optimum combination of weighing hoppers containing articles having a combined weight value equal or nearest to a preset target weight. The weighing hoppers 12 associated with the plural weighing machines 10 . . . 10 that fall within the optimum combination have their upper and lower gates 120, 121 opened by the push rods 17, which are thrust forward for this purpose. The gates 120, 121 operate in the following manner.

Figure 8:
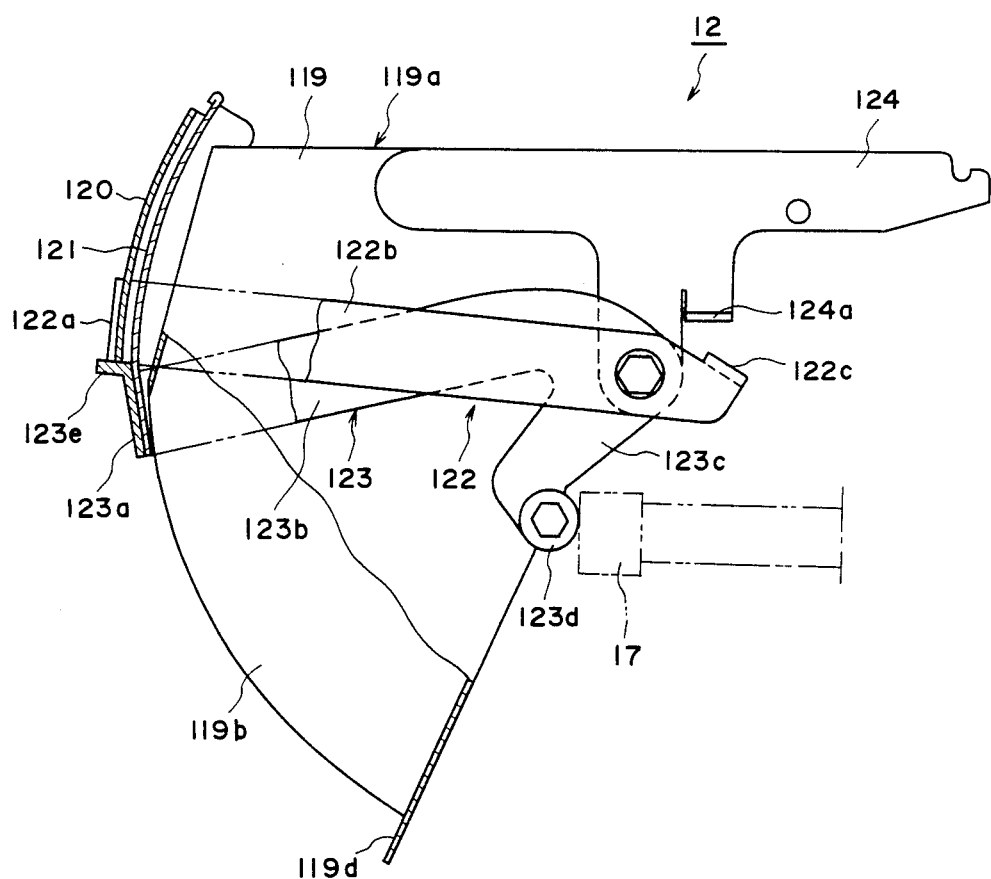
FIG. 8 is a view for describing the operation of the weighing hopper.

First, the lever portion 123c of the arm member 123 fixedly secured to the lower gate 121 is pushed by the push rod 17 via the roller 123d, thereby raising the lower gate 121 to open the lower half portion of the discharge outlet 119b. At such time the lower gate 121 overlaps the inner side of the upper gate 120 closing the upper half portion of the discharge outlet 119b, and the engaging piece 123e, which is provided on the intermediate side portion 123a of the arm member 123 secured to the lower gate, engages the lower end portion of the upper gate 120. Consequently, when the lower gate 121 is raised further by the push rod 17, the upper gate 120 is raised together with the lower gate 121. As a result, both gates 120, 121 are raised to a position above the discharge outlet 119b, so that the outlet 119b is opened to substantially the maximum extent. In such case, since the gates 120, 121 overlap each other, as shown in FIG. 8, the gates do not project beyond the upper end face of the hopper main body 119 to a great degree despite the fact that the discharge outlet 119b is opened so widely. The gates 120, 121 thus do not interfere with the pool hopper 9 overlying the weighing hopper 112.

It should be noted that when the upper and lower gates 120, 121 are in the positions for closing off the discharge outlet 119b, as shown in FIG. 5, the weight of the articles within the hopper main body 119 acts directly upon the gates 120, 121. However, the direction (indicated by the arrow a in FIG. 5) in which this weight acts is at right angles to the opening direction of the gates 120, 121, so that the gates will not be opened by the weight of the articles.

Thus, those weighing hoppers 14 . . . 14 corresponding to the weight values that fall within the optimum combination have their gates 120, 121 . . . 120, 121 opened by thrusting forward the push rods 17 . . . 17 from the side surfaces of the respective base portions 2a, 2a. The articles thus discharged from the weighing hoppers fall onto the collecting conveyor 5 travelling below the weighing hoppers. In this way a batch of articles having a total weight equal or closest to the target weight is obtained on the collecting conveyor 5. The batch is gathered together by the discharge conveyor 6, shown in FIG. 1, and is supplied by the conveyor 6 to a packaging apparatus or the like. When the optimum combination is selected, there are cases where two weighing machines 10, 10 occupying opposing positions fall within the optimum combination simultaneously. In such cases, control is effected in such a manner that the articles for the next weighing cycle are supplied solely to the weighing machine 14 on one or the other side, with the remaining empty weighing hopper being subjected automatically to a zero-point adjustment at the next weighing cycle. It should be noted that the series of operations described above is executed by the control unit in accordance with a program stored therein.

When articles are discharged by the weighing hoppers 14 . . . 14 in the manner described above, the pool hoppers 9 . . . 9 corresponding to those weighing hopper sets which include a weighing hopper that has accomplished the discharge are moved from the intermediate position A to the left or right by the action of the cylinders 21 . . . 21. Thus, these pool hoppers are brought to the position B or C directly above the aforementioned weighing hopper 14. The gate 23 on the side to which the pool hopper has been moved is opened to supply the articles for the next weighing cycle from the pool hopper 9 to the empty weighing hopper 14. The next weighing cycle is performed at the moment that all weighing hoppers 14 . . . 14 are supplied with articles. In the meantime, the pool hoppers 9 . . . 9 that have supplied articles to the weighing hoppers 14 . . . 14 are restored to the intermediate position A, whereupon the operator takes the articles from the article supply table 3 and charges the articles X into these pool hoppers to prepare for the next supply cycle.

Thereafter, the foregoing operations are repeated in similar fashion. In each weighing cycle, a combinatorial computation is performed based on weight values from the 12 weighing machines in accordance with the illustrated embodiment. The operator, however, need only supply articles to a maximum of six (ordinarily three or four) of the pool hoppers 9 . . . 9 each weighing cycle. Moreover, since the pool hoppers can be brought much closer together in comparison with an arrangement in which one pool hopper is disposed for each single weighing machine, the pool hoppers can be arranged in a concentrated configuration to facilitate visual confirmation of empty pool hoppers as well as the supply of articles to the pool hoppers.

In the foregoing embodiment, the article supply table 3 has the lower edge on one side thereof connected to the base 2 via hinge mechanisms 27, as shown in FIG. 3. By using handles 28 provided on the side face on the opposite side of the table 3, the table can be swung upward and away from the base 2 together with the pool hoppers 9 . . . 9, cylinders 21 . . . 21, guide plates 26 . . . 26 and the like. A telescoping support rod 29 is provided for holding the table 3 in the opened attitude. This makes it easier to clean the pool hoppers 9 . . . 9 and weighing hoppers 12 . . . 12.

The collecting conveyor 5 accommodated between the side portions 2a, 2a of the base 2 has casters 30, 30 provided at the bottom part of its front portion. The middle or rear portion of the conveyor 5 is received by a plurality of rollers 31, 31 axially supported on the side face of each base side portion 2a, 2a. Thus the conveyor 5 may be withdrawn with little effort for cleaning or other purposes.

Figure 9:
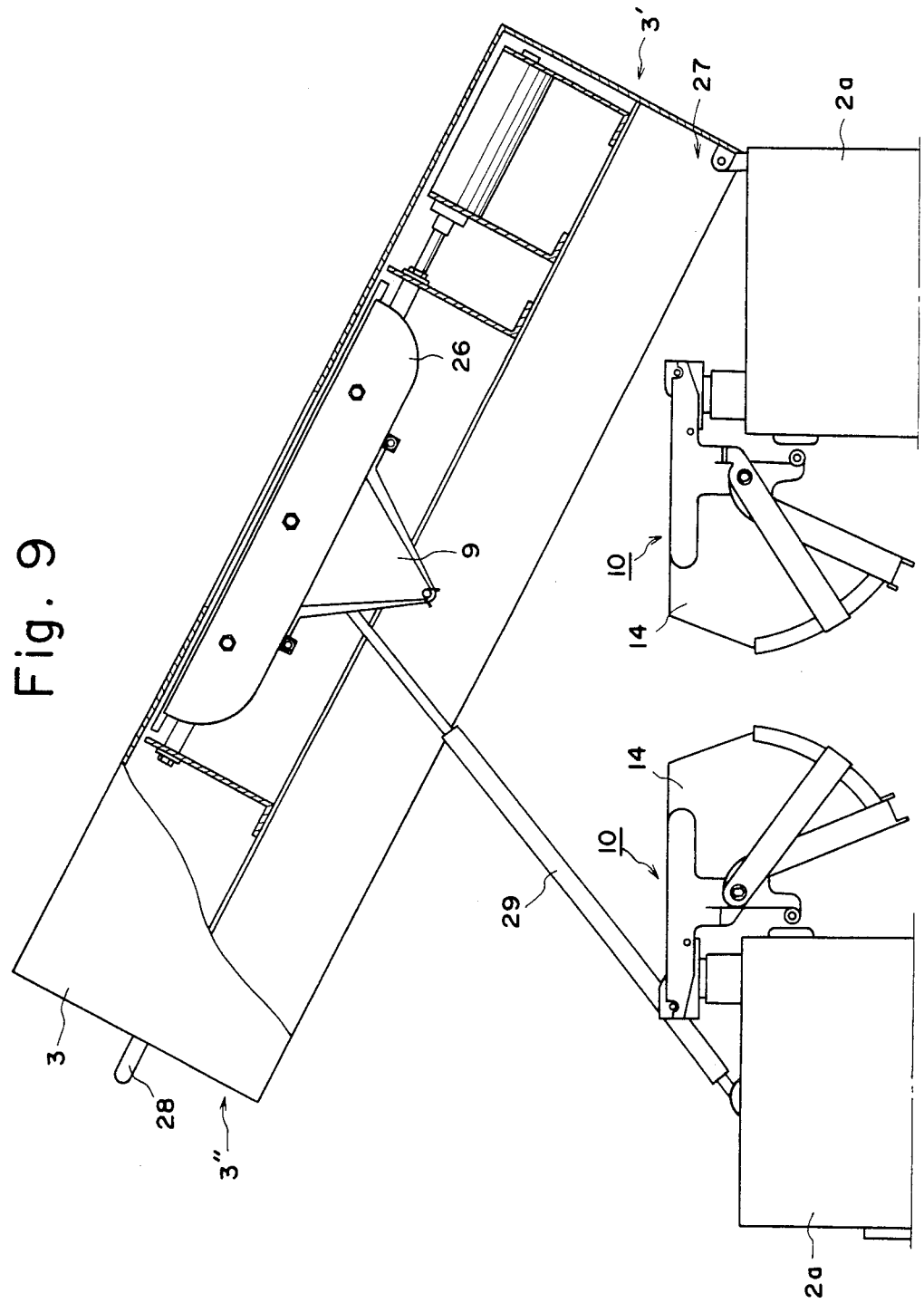
FIG. 9 is a partial side view illustrating an article supply table in the opened state.

Depending upon the type and nature of the articles being weighed, the interiors of the pool hoppers 9 . . . 9 and weighing hoppers 14 . . . 14 become coated with contaminants or with fragments of the articles owing to the foregoing weighing operation. This is a particularly undesirable condition in terms of sanitation if the articles being weighed are foodstuffs. With the foregoing construction of the invention, the interiors of the pool hoppers 9 . . . 9 are exposed through the respective article charging inlets 4 . . . 4 and may therefore be cleaned with relative ease, whereas the weighing hoppers 14 . . . 14 are completely covered by the overlying pool hoppers 9 . . . 9 and by the article supply table 3, as shown in FIG. 3, thereby making cleaning impossible in the condition shown. According to the present invention, however, the article supply table 3 is connected at its side portion 3' to the base 2 by the hinge mechanisms 27, 27. When the handles 28, 28 provided on the opposite side portion 3" of the table 3 are pulled upwardly the side portion 3", together with the pool hoppers 9 . . . 9 and cylinders 21 . . . 21, as shown in FIG. 9, can be raised and the table 3 can be held in this attitude by the support rod 29. The weighing hoppers 14 . . . 14 are thus exposed from above to make it possible to attach and detach the weighing hoppers and to clean the interior of the weighing hoppers from the side of the apparatus.

Further, in the foregoing embodiment, as shown in FIG. 3, the collecting conveyor 5 accommodated between the side portions 2a, 2a of the base 2 has casters 30, 30 provided at the bottom part of its front portion, and the middle or rear portion of the conveyor 5 is received by the plurality of rollers 31, 31 axially supported on the side face of each base side portion 2a, 2a. Thus the conveyor 5 may be withdrawn for cleaning with little effort.

A second embodiment of the present invention will now be described with reference to FIGS. 10 through 15.

Figure 10:
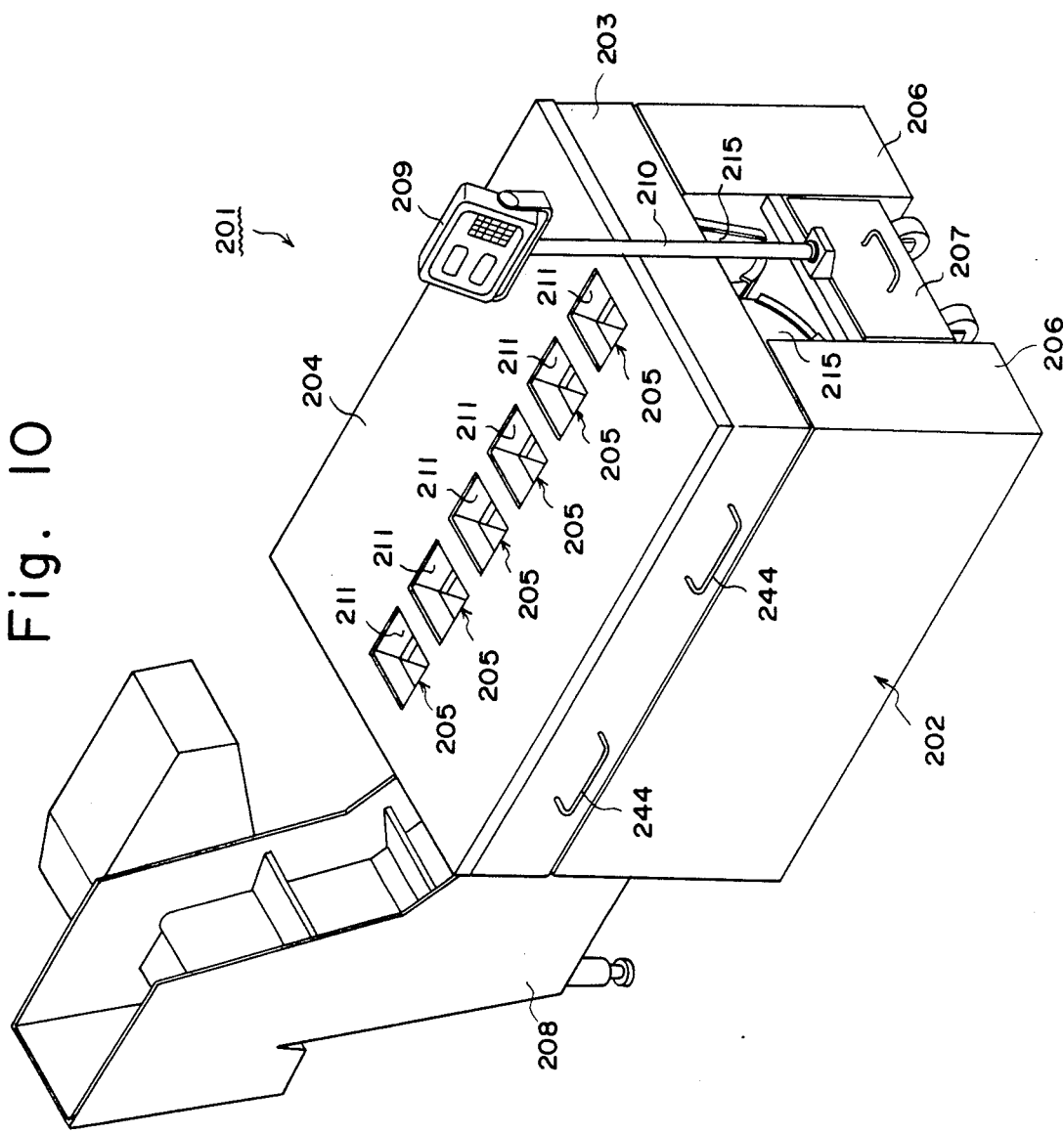
FIG. 10 is a perspective view illustrating a second embodiment of the present invention.

As shown in FIG. 10, the main body of a combinatorial weighing apparatus 201 includes a base 202 and an article supply table 203 disposed on the base 202. Formed at the central portion of a flat plate 204 constituting an upper side of the article supply table 203 are a row of article charging inlets 205 . . . 205, six in the present embodiment. The base 202 is separated into left and right side portions 206, 206 between which a collecting conveyor 207 is so accommodated as to be withdrawable from one or a first end of the base 202. The terminus of the collecting conveyor 207 located at the other or second end of the base is contiguous to a discharge conveyor 208. A control box 209 is mounted on an upstanding support post 210 attached to one side of the base 202, and is provided with an array of keys such as numeric keys for setting a target weight and allowable error limits with respect to the target weight, and with display devices for displaying, e.g., a measured weight.

Figure 11:
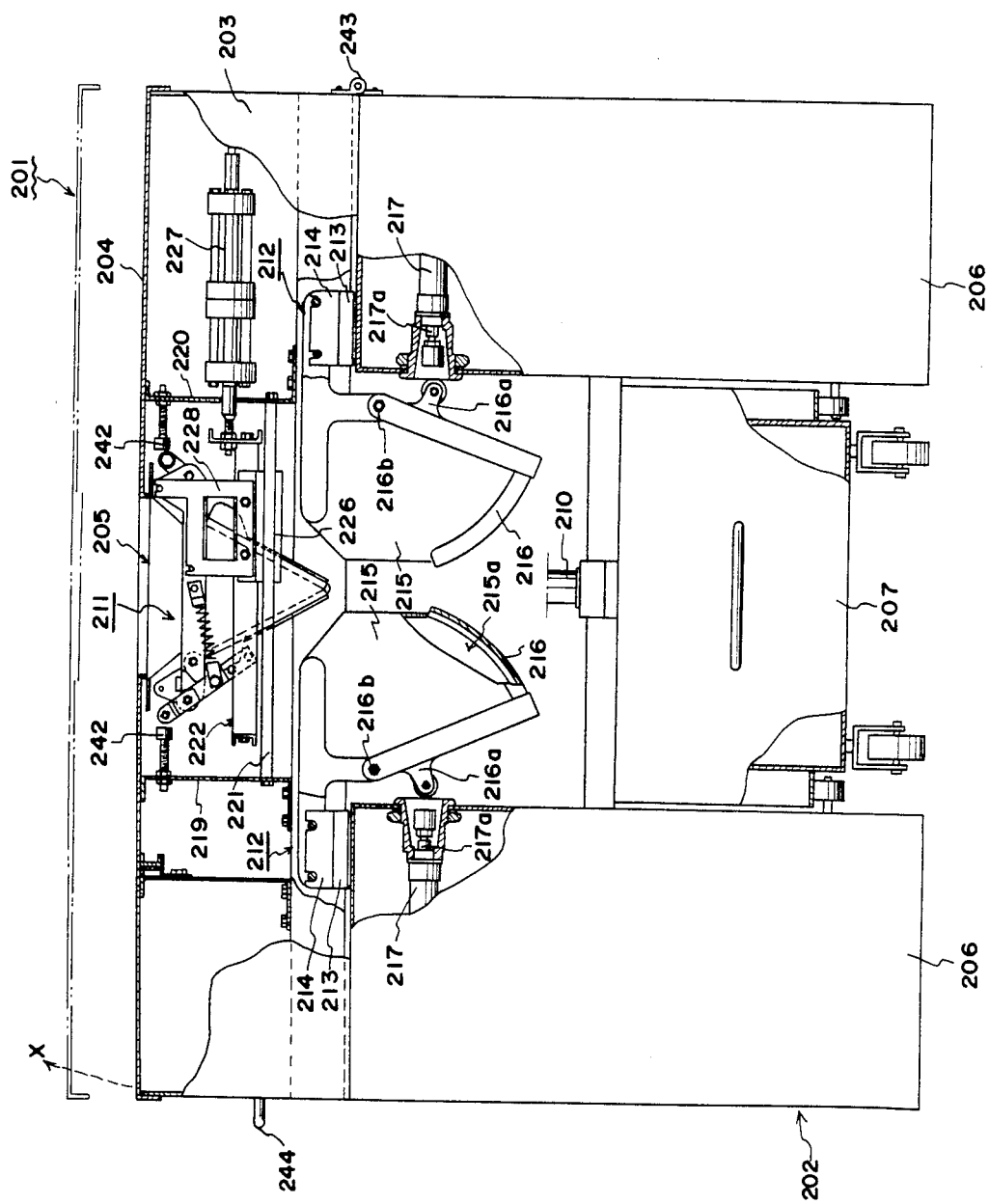
FIG. 11 is a side view of the second embodiment.
Figure 12:
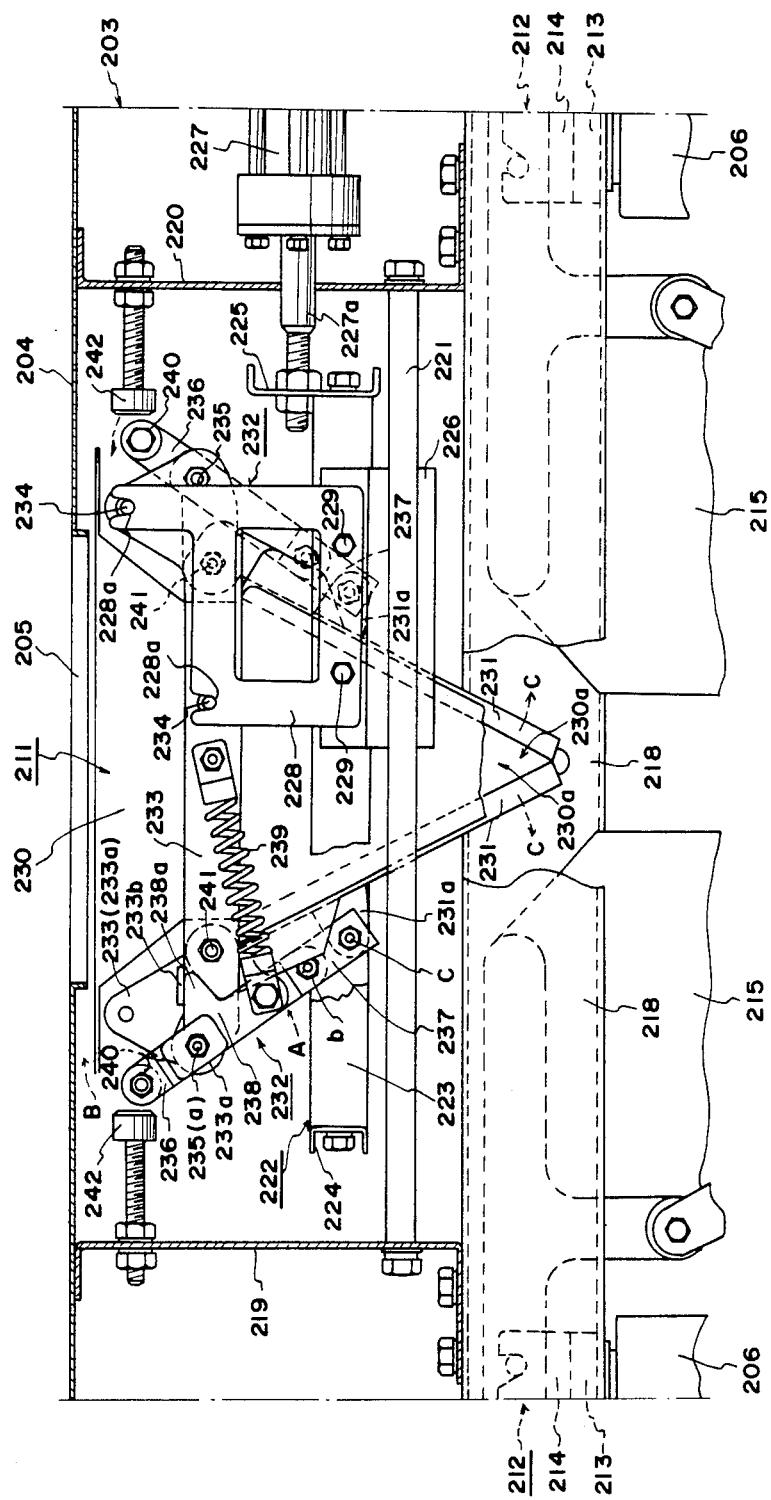
FIG. 12 is a side view illustrating a pool hopper and its environs.
Figure 13:
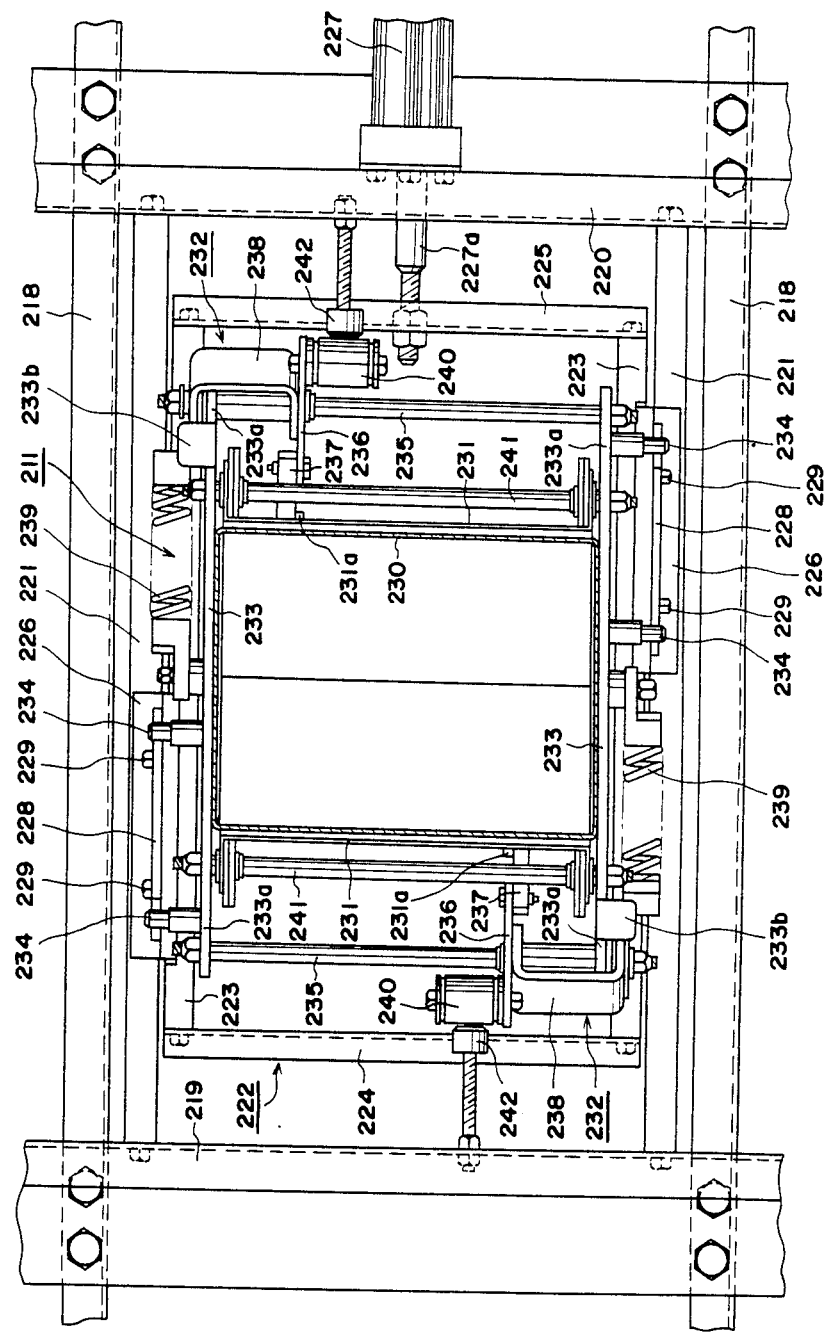
FIG. 13 is a top view illustrating a pool hopper and its environs.

The internal structure of the combinatorial weighing apparatus 201 will now be described. As shown in FIG. 11, pool hoppers 211 . . . 211 are disposed within the article supply table 203 below respective ones of the charging inlets 205 . . . 205 of the plate 204. A row of weighing machines 212 . . . 212 is disposed on each of the side portions 206, 206 of the base 202. Each of the weighing machines 212 comprises a weight sensor 213 such as a load cell secured on the upper side of the respective base side portion 206, and a weighing hopper 215 detachably mounted on the weight sensor 213 via engaging members 214. The load acting upon the weight sensor 213 is the combined weight of the weighing hopper 215 and of the articles supplied to the weighing hopper. Each weighing hopper 215 is equipped with a gate 216 for opening and closing a discharge outlet 215a formed at the lower side face of the weighing hopper. Provided within each base side portion 206 is a cylinder 217 for raising the gate 216. The cylinder 217 has a piston rod 217a the distal end whereof pushes an arm portion 216a of the gate 216 when the piston rod 217a is thrust forward, thereby swinging the gate 216 upwardly about the fulcrum 216b to open the discharge outlet 215a. As shown in FIG. 11, two weighing machines 212, 212 are mounted on respective ones of the base side portions 206, 206 at corresponding positions. The weighing hoppers 215, 215 of these weighing machines 212, 212 are arranged closely together in an opposing relationship above the collecting conveyor 207. The pool hopper 211 is situated above these two weighing hoppers 215, 215. The pool hopper 211 and two weighing machines 212, 212 constitute a single weighing unit. In the present embodiment, six weighing units are juxtaposed in a single row to correspond to the six article charging inlets 205 . . . 205 formed in the plate 204, as depicted in FIG. 10.

In each weighing unit, the pool hopper 211 is capable of sliding from an intermediate position above the two opposing weighing hoppers 215, 215 to positions directly above the weighing hoppers 215, 215. The construction of the pool hopper 211 and the arrangement for sliding the pool hopper will now be described.

As shown in FIGS. 12, 13, 14A and 14B, left and right side plates 219, 220 extending parallel to the direction in which the weighing units are juxtaposed are supported within the article supply table 203 via frames 218 . . . 218 spanning the table laterally. The pool hopper 211 is situated between the side plates 219, 220. Supported by and spanning the side plates 219, 220 are a pair of guide rails 221, 221 extending along both sides of the pool hopper 211. A slide base 222 engages and spans the rails 221, 221. The slide base 222 has a rectangular configuration formed by a pair of side frames 223, 223, a front frame 224 and a rear frame 225. Fixedly secured to the side frames 223, 223 are respective engaging members 226, 226, which engage the guide rails 221, 221. The slide frame 222 is supported so as to be slidable to the left and right as viewed in the drawings. A cylinder 227 is provided for driving the slide base 222 and has a piston rod 227a which is connected to the rear frame 225 of the slide base 222. Along with the engaging members 226, 226, hopper support members 228, 228 are fixedly secured to both side frames 223, 223 of the slide base 222 by bolts 229, 229. Provided at the upper portion of each support member 228, 228 are two hopper engaging recesses 228a, 228a.

The pool hopper 211, shown in FIG. 14A, is composed of a main body 230 substantially in the shape of an inverted triangle, the upper side of the main body being open, a pair of gates 231, 231 for opening and closing respective discharge outlets 230a, 230a provided on the sides of the main body 230 at the lower portion of the main body, and link mechanisms 232, 232 for opening and closing the respective gates 231, 231. Brackets 233, 233 are fixedly secured to both sides of the main body 230. Projecting from each bracket 233 are two engaging pins 234, 234, for a total of four of such pins. The pool hopper 211 is supported detachably on the slide base 222, shown in FIG. 14B by engaging the engaging pins 234 . . . 234 with four recesses 228a . . . 228a provided in the hopper support members 228, 228 of the slide base 222.

Each of the link mechanisms 232, 232 is composed of a drive link 236 pivotally supported on a support shaft 235 bridging outwardly projecting portions 233a, 233a of the brackets 233, 233, a follower link 237 having one end connected to the free end of the drive link 236 and having its other end connected to a projection piece 231a provided on the gate 231, an auxiliary link 238 fixedly secured to the drive link 236 for pivoting together with the drive link, and a return spring 239 stretched between the link 238 and the central portion of the bracket 233 for biasing the auxiliary link 238 and, hence, the drive link 236, in the direction of arrow A. In the attitude shown in FIGS. 12, 13 and 14, the projecting portion 238a provided on the auxiliary link 238 is in abutting contact with a stopper 233b provided on the bracket 233, so that the pivotal motion of the auxiliary link 238 and drive link 236 in the direction A, which motion is attributable to the force applied by the spring 239, is stopped at a predetermined position. In this condition the gate 231 is held, via the follower link 237, at a position where it closes the discharge outlet 230a. When a roller 240 provided on the distal end of the drive link 236 is urged in the direction of the arrow B owing to an external force, the drive link 236 and the auxiliary link 238 are pivoted in the same direction (opposite to the direction A) against the biasing force of the spring 239, whereby the gate 231 is swung open via the follower link 237 in the direction of the arrow C about a support shaft 241. The link mechanism 232 constitutes a toggle mechanism and, when the gate 231 closes the discharge outlet 230a, the fulcrum a (support shaft 235) of the drive link 236, a point b at which the drive link 236 and follower link 237 are connected, and a point c at which the follower link 237 and gate 231 are connected, lie on a straight line. Thus the arrangement is such that the gate 231 will not be opened by a force acting upon it from the inner side.

The side plates 219, 220 are projectively provided with respective pushing members 242, 242 at positions corresponding to the rollers 240, 240 at the distal ends of the drive links 236, 236 constituting the two link mechanisms 232, 232 for the pool hopper 211. When the pool hopper 211 slides, together with the slide base 222, to the left or right from the intermediate position shown in FIG. 12 by actuating the cylinder 227, the roller 240 at the distal end of the drive link 236 of the link mechanism 232 on the side of the direction of travel is urged in the direction B by the corresponding pushing member 242.

In the present embodiment, the article supply table 203 containing the six pool hoppers 211 . . . 211 has the lower edge of one side thereof connected to one base side portion 206 by hinges 243, and handles 244 are provided on the opposite side face of the table 203, as shown in FIG. 11. Thus the article supply table is designed to be lifted at one end thereof in the direction of the arrow X. The plate 204, which constitutes the upper side of the supply table 203 and which is provided with the inlets 205 . . . 205 for charging articles into the pool hoppers 211 . . . 211, is capable of being detached from the supply table 203 by pulling it upwardly from the table.

The operation of the second embodiment of the present invention will now be described.

We shall assume that articles to be weighed have been introduced into the pool hopper 211 and weighing hoppers 215, 215 of two weighing machines 212, 212 in each of the weighing units. Under these conditions, the articles within each of the weighing hoppers 215 . . . 215 are weighed by respective ones of the weight sensors 213 . . . 213 of the 12 weighing machines 212 . . . 212, a combinatorial computation based on the weight values obtained is performed, and there is selected an optimum combination having a combined or total weight equal or nearest to a preset target weight. Those weighing hoppers 215 . . . 215 corresponding to the optimum combination have their gates 216 . . . 216 opened by thrusting forward the push rods 217a . . . 217a from the cylinders 217 . . . 217 within the base portions 206, 206. The articles thus discharged from the weighing hoppers fall onto the collecting conveyor 207 travelling below the weighing hoppers. In this way a batch of articles having a total equal or closest to the target weight is obtained on the collecting conveyor 207. The batch is gathered together by the discharge conveyor 208, shown in FIG. 10, and is carried out by the conveyor 208.

When articles have been discharged from a plurality of the weighing hoppers 215 . . . 215 in this manner, the following actions take place in those weighing units that contain weighing hoppers 215 . . . 215 which have accomplished the discharge and are empty. Specifically, the pool hoppers 211 . . . 211, which are located at the intermediate position, are caused to slide to the left or right, together with the slide base 222 by actuating the cylinder 227, thereby situating the pool hoppers directly above those weighing hoppers 215 . . . 215 that are empty. At this time, with regard to each of the pool hoppers 211 that has been caused to slide to a position above a weighing hopper 215 the roller 240 at the distal end of the drive link 236 in the link mechanism 232 associated with the gate 231 on the side of direction of travel (the gate on the left side in FIG. 15), is brought into abutting contact with the pushing member 242. As a result, the drive link 236 is pivoted in the direction of arrow B and, concurrent therewith, the gate 231 is swung open in the direction of arrow C via the follower link 237, whereby the articles within the pool hopper 211 are supplied to the underlying weighing hopper 215 to take part in the next weighing cycle. When the articles have been supplied to the empty weighing hoppers 215 . . . 215 in this fashion, the next weighing cycle is carried out. In the meantime, the pool hoppers 211 . . .

211 that have supplied the articles to the weighing hoppers 215 . . . 215 are returned to the intermediate position by the cylinder 227, and the drive link 236 (roller 240) in the link mechanism 232 is separated from the pushing member 242, whereby the open gate 231 is closed by the return spring 239. When the pool hoppers return to the intermediate position, articles to be weighed are introduced into the pool hoppers from the charging inlets 205 . . . 205 of the article supply table 203 (plate 204) to prepare for the next supply cycle. When the two weighing machines 212, 212 in a weighing unit fall within an optimum combination simultaneously, the articles for the next weighing cycle can be supplied to only one of the weighing machines. In such case, the empty weighing machine 212 is subjected to zero-point adjustment processing at the next weighing cycle. It should be noted that the series of operations described above is executed by the aforementioned control unit in accordance with a program stored therein.

Thereafter, the following operations are performed in a similar manner. According to the above-described arrangement, one pool hopper 211 supplies two weighing hoppers 215, 215 with articles to be weighed, so that the number of pool hoppers 211 . . . 211 need be only half the number of weighing hoppers 215 . . . 215 and, hence, half the number of weighing machines 212 . . . 212. In addition, since the gates 231, 231 provided on each pool hopper 211 are swung open in response to the sliding movement of the hopper 211, it is unnecessary to provide a separate gate actuating device.

Further, in the present embodiment, the link mechanisms 232, 232 for opening and closing the gates 231, 231 of each pool hopper 211 constitute toggle mechanisms and, when the gates 231, 231 are closed, they will not be opened by a force acting upon them from inside the pool hopper 211. Accordingly, when the articles to be weighed are dumped into the pool hopper 211, the gates 231, 231 will not be opened by the impact and, hence, the articles will not fall from the pool hopper. There is also no danger of the articles leaking from between the gates 231, 231 and the hopper body owing to incomplete closure of the gates 231, 231.

In the above-described second embodiment of the invention, the plate 204 constituting the upper side of the article supply table 203 is capable of being detached from the supply table 203 by being lifted upwardly, and the pool hoppers 211 . . . 211 accommodated within the supply table 203 are supported by engaging the pins 234, 234 on both side surfaces of the main body with the recesses 228a, 228a of the hopper support members 228, 228 of the slide base 222. If the plate 204 is removed the pool hoppers 211 . . . 211 can be detached with ease. Further, the article supply table 203 overlying the weighing hoppers 215 . . . 215 can be swung open in the direction X, as shown in FIG. 11, and the weighing hoppers 215 . . . 215 are detachably supported, with respect to the respective weight sensors 213 . . . 213, via the engaging members 214 . . . 214, making it easy to detach the weighing hoppers 215 . . . 215. Therefore, when the hoppers 211 . . . , 211, 215 . . . 215 are to be cleaned, this can be accomplished after they have been detached from the apparatus proper.

As many apparently widely different embodiments of the present invention can be made without departing from the spirit and scope thereof, it is to be understood that the invention is not limited to the specific embodiments described except as defined in the appended claims.

What I claim is:

1. A combinatorial weighing apparatus for selecting an optimum combination of batches of articles, each batch of articles having a weight value, by performing a combinatorial computation based on the weight values of the batch of articles and discharging the batches of articles corresponding to the optimum combination, comprising:
   a base;
   a plurality of first and second weighing machines arranged on the base so that each first weighing machine confronts a second weighing machine;
   a plurality of first and second weighing hoppers respectively provided on corresponding first and second weighing machines;
   an article supply table provided on the base having a bottom and a plurality of charging inlets; and
   a plurality of pool hoppers attached to the bottom of the article supply table above corresponding first and second weighing hoppers and movable between an intermediate position below a corresponding charging inlet and first and second positions above the respective first and second weighing hoppers, the first and second positions being located on either side of the intermediate position.

2. A combinatorial weighing apparatus for selecting an optimum combination of batches of articles, each batch of articles having a weight value, by performing a combinatorial computation based on the weight values of the batches of articles and discharging the batches of articles corresponding to the optimum combination, comprising:
   a base;
   a plurality of first and second weighing machines arranged on the base so that each first weighing machine confronts a second weighing machine;
   a plurality of first and second weighing hoppers respectively provided on corresponding first and second confronting weighing machines;
   an openable and closable article supply table provided on the base above the weighing hoppers having a bottom and a plurality of charging inlets; and
   a plurality of pool hoppers attached to the bottom of the article supply table, each pool hopper forming a set with a corresponding pair of first and second weighing hoppers, each pool hopper being situated above the weighing hoppers in the set and being movable between an intermediate position below a corresponding charging inlet for introducing articles into the pool hopper, and first and second positions above the respective first and second weighing hoppers, the first and second positions being located on either side of the intermediate position.

3. A combinatorial weighing apparatus according to claim 2, further comprising:
   a collecting conveyor situated below said weighing hoppers for receiving articles discharged from said weighing hoppers and for transporting said articles from the combinatorial weighing apparatus.

4. A combinatorial weighing apparatus according to claim 2, further comprising:
   a plurality of guide plates, corresponding to and disposed along a direction of travel of each pool hopper, having a lower edge, the lower edge having first and second upwardly curved end portions, wherein each pool hopper has first and second discharge outlets, first and second gates for opening and closing the respective first and second discharge outlets each gate having a roller which travels along the lower edge of the corresponding guide plate so that the gate opens the respective discharge outlet of said pool hopper when the roller is situated at the respective upwardly curved end portion of the guide plate.

5. A combinatorial weighing apparatus according to claim 2, wherein said weighing hoppers and said pool hopper are detachable from said combinatorial weighing apparatus.

6. A combinatorial weighing apparatus according to claim 2, further comprising:
drive means for moving each pool hopper between the first, intermediate and second positions and
first and second pushing members at the respective first and second positions,
wherein each pool hopper has a hopper body having first and second discharge outlets and first and second gates pivotably supported on the hopper body for opening and closing the respective first and second discharge outlets, each gate having a link mechanism for rotating the gate to open the corresponding discharge outlet and wherein the first pushing member causes the link mechanism of the first gate to open the first gate when the drive means moves the pool hopper to the first position and the second pushing member causes the link mechanism of the second gate to open the second gate when the drive means moves the pool hopper to the second position.

7. A combinatorial weighing apparatus according to claim 6, wherein the link mechanism is a toggle mechanism including
a pivotable drive link having a fulcrum, an end to which a pushing force is applied and an other end,
a follower link having an end which is connected to the other end of the drive link and an other end connected to the gate, and
a spring for biasing the gate in a closing direction via the drive and follower links, so that the fulcrum of the drive link, the point at which the drive link and follower link are connected, and the point at which the follower link and gate are connected, are situated on a straight line when the gate is closed.

8. A combinatorial weighing apparatus for selecting an optimum combination of batches of articles, each batch of articles having a weight value, by performing a combinatorial computation based on the weight values of the batches of articles and discharging the batches of articles corresponding to the optimum combination, comprising:
a base;
an openable and closeable plate provided on the base having a plurality of article charging inlets;
a plurality of sets of hoppers, each set including
two weighing hoppers arranged on the base so as to confront each other and
one pool hopper, detachably supported from the openable and closeable plate above said weighing hoppers, having two discharge outlets for supplying articles to said weighing hoppers and being movable between an intermediate position below a corresponding article charging inlet, and positions located on either side of said intermediate position above respective ones of said two weighing hoppers; and
a collecting conveyor situated below said weighing hoppers for receiving articles discharged from said weighing hoppers and for transporting said articles.

9. A combinatorial weighing apparatus according to claim 8, wherein each weighing hopper has
an article charging inlet and an article discharge outlet having an upper portion and a lower portion
an upper gate for opening and closing said upper portion of said article discharge outlet,
a lower gate for opening and closing said lower portion of said article discharge outlet and
engaging means provided on said lower gate for bringing the upper gate and lower gate into engagement when said upper and lower gates overlap during an operation for opening said upper and lower gates
further comprising means for applying a driving force for opening the lower gate.

10. A combinatorial weighing apparatus according to claim 8, wherein each pool hopper has
an article charging inlet and an article discharge outlet having an upper portion and a lower portion;
an upper gate for opening and closing the upper portion of the article discharge outlet;
a lower gate for opening and closing the lower portion of the article discharge outlet;
means for applying a driving force for opening the lower gate; and
engaging means provided on the lower gate for bringing the upper gate and lower gate into engagement when the upper and lower gates overlap during an operation for opening the upper and lower gates.

11. A combinatorial weighing apparatus according to claim 7, wherein said weighing hoppers and said pool hopper are detachable from said combinatorial weighing apparatus.

12. A combinatorial weighing apparatus, comprising:
a base having first and second base portions;
a plurality of first and second weighing machines provided on the first and second base portions, respectively, each first weighing machine opposing a second weighing machine;
a plurality of first and second weighing hoppers provided on corresponding first and second weighing machines, respectively;
an article supply table, provided on the base, having a plurality of charging inlets;
a plurality of pool hoppers suspended from the article supply table above corresponding first and second weighing hoppers, each pool hopper being movable between an intermediate position below a corresponding charging inlet, a first position located above the corresponding first weighing hopper and a second position located above the corresponding second weighing hopper.

13. A combinatorial weighing apparatus according to claim 12, further comprising a conveyor located between the first and second base portions for receiving articles from the weighing hoppers.

14. A combinatorial weighing apparatus according to claim 12, wherein the article supply table is pivotably attached to the first base portion.

15. A combinatorial weighing apparatus according to claim 12, wherein each weighing hopper includes a hopper body having a discharge opening and a gate pivotably supported on the hopper body for opening and closing the discharge opening.

16. A combinatorial weighing apparatus according to claim 15, wherein the gate includes independently pivotable upper and lower gate portions, the lower gate portion having an engaging piece and the upper gate portion having a lower end, and wherein the engaging piece engages the lower end of the upper gate portion so that the upper portion is opened when the lower portion is opened.

17. A combinatorial weighing apparatus according to claim 12, further comprising means ror sliding each pool hopper between the first, intermediate and second positions.

18. A combinatorial weighing apparatus according to claim 17, further comprising means for opening the gate on each weighing hopper.

19. A combinatorial weighing apparatus according to claim 12, wherein each pool hopper has first and second discharge outlets and first and second gates for opening and closing the first and second discharge outlets, respectively, further comprising means for opening the first gate of each pool hopper when the pool hopper is in the first position and opening the second gate of each pool hopper when the pool hopper is in the second position.

20. A combinatorial weighing apparatus, comprising:
a base having first and second base portions;
an article supply table, pivotably attached to the first base portion, having a plurality of charging inlets;
a plurality of first and second weighing machines, provided on the first and second base portions, respectively, each first weighing machine opposing a second weighing machine;
a plurality of first and second weighing hoppers provided on corresponding first ano second weighing machines, respectively, each weighing machine including a hopper body having a discharge opening and a gate pivotably supported on the hopper body for opening and closing the discharge opening;
means for opening the gate on each weighing hopper;
a plurality of pool hoppers suspended from the article supply table above corresponding first and second weighing hoppers, each pool hopper being movable between an intermediate position below a corresponding charging inlet, a first position located above the corresponding first weighing hopper and a second position located above the corresponding second weighing hopper;
means for moving each pool hopper between the first, intermediate and second positions; and
a conveyor located between the first and second base portions for receiving articles from the weighing hoppers.

* * * * *